June 1, 1954     L. H. METZGER     2,679,839
CABLE VARIETY STONE CUTTING SAW
Filed Sept. 5, 1952
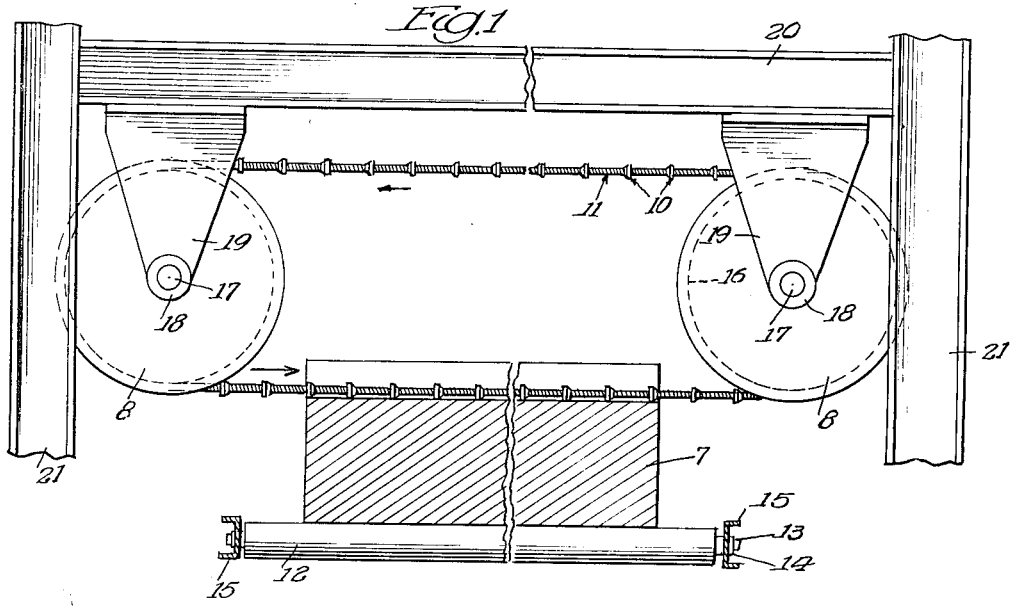
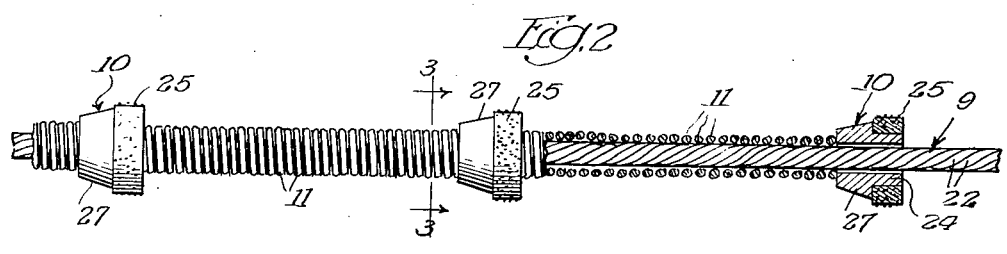
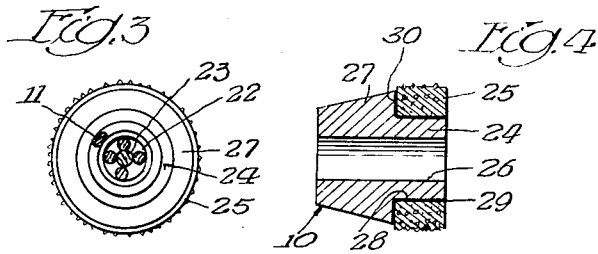
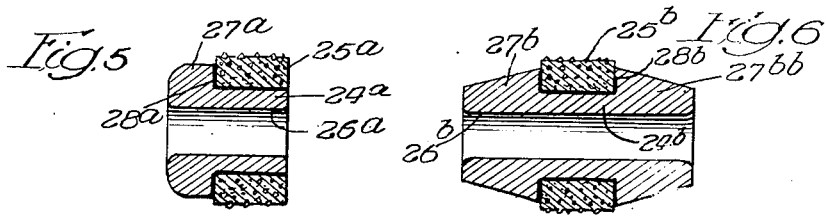
Inventor
Leopold H. Metzger
By Fred Gerlach, Atty.

Patented June 1, 1954

2,679,839

UNITED STATES PATENT OFFICE 2,679,839

CABLE VARIETY STONE CUTTING SAW

Leopold H. Metzger, Chicago, Ill., assignor to Super-Cut, Inc., Chicago, Ill.

Application September 5, 1952, Serial No. 308,004

12 Claims. (Cl. 125—21)

The present invention relates generally to saws for cutting stone, such, for example, as limestone, marble or granite. More particularly the invention relates to that type of saw which is known in the art as a cable variety stone cutting saw and as its parts or components comprises: (1) an endless flexible wire cable which is adapted to be trained around and supported by a pair of spaced apart pulleys with circumferentially grooved rims or peripheries; (2) a plurality of centrally apertured cutting elements which are loosely mounted on the cable in spaced apart relation; and (3) a plurality of springs which are mounted on the cable between the cutting elements and serve to space the elements apart while at the same time permitting them to slide to a limited extent lengthwise of the cable during a stone cutting operation.

In connection with use of a saw of the aforementioned type one of the pulleys is driven to effect drive of the cable with the cutting elements and springs thereon and the stone to be cut and the assembly of pulleys and cable are fed one relatively to the other in such manner that the stone is traversed by one reach of the cable to the end that the cutting elements on the one reach cut the stone. Also in connection with use of a saw of the type under consideration a liquid coolant under pressure is directed against one reach of the cable in order to cool it and also the cutting elements, the springs, and the parts of the stone being cut by the cutting elements. As evidenced by United States Patent No. 2,473,104, dated June 14, 1949 and entitled "Arrangement for Sawing Stones" it has heretofore been proposed in connection with fabrication of a cable variety stone cutting saw of the type under consideration to form each centrally apertured cutting element entirely of tungsten carbide (carboram) or similar abrasive material. In practice it has been found that when the cutting elements are so formed the saw as a whole has a comparatively short life for several reasons. In the first place, since the inner peripheral portions or surfaces of the cutting elements are in direct contact with the adjacent portions of the cable there is a marked tendency for the elements to wear away or cut the cable, especially when they slide to a limited extent relatively to the cable or travel around the pulleys. Secondly, when the cutting elements are successively brought into engagement with the stone being cut they are subjected to such shock or impact as to cause them to fracture even though they are cushioned by the springs on the cable. Thirdly, the leading portions of the cutting elements are subjected to rapid wear because they are exposed to the abrading action of the sludge that consists of the cut stone particles and the liquid coolant.

The principal object of this invention is to provide a cable variety stone cutting saw which, due to the particular construction, arrangement and design of its cutting elements, is an improvement upon, obviates the objections to, and has greater efficiency and longer life than, previously designed saws of the same general character. Generally speaking, each cutting element of the improved saw is characterized by the fact that it comprises a tubular metallic body part of circular cross section and an annular cutting part which extends around, and is fixedly bonded to, the body part and is in the form of a rigid metallic matrix with crushed or fragmented diamonds distributed substantially uniformly throughout. By having the cutting elements include or embody the tubular metallic body parts which surround the cable and serve to hold the annular cutting parts out of engagement with the cable the cutting elements in connection with use of the saw do not wear or cut the wire cable and hence the life of the saw as a whole is materially prolonged.

Another object of the invention is to provide a cable variety stone cutting saw of the last mentioned character in which the tubular metallic body parts of the cutting elements are provided at their leading ends with integral outwardly extending annular flanges which are in lapped relation with the front end surfaces of, and are of less external diameter than, the annular cutting parts and have a twofold purpose in that they serve, first, to absorb shock or impact resulting from contact of the cutting elements with the stone being cut and tending to fracture the annular cutting parts and, second, to form barriers for protecting the front end portions of the annular cutting parts from being rapidly worn away by sludge.

A further object of the invention is to provide a cable variety stone cutting saw of the type and character last mentioned in which the annular outwardly extending integral flanges on the leading ends of the body parts of the cutting elements are so shaped that they progressively increase in external diameter from front to back in order that when the cutting elements are in engagement with the stone being cut the elements slide or travel readily and smoothly relatively to the stone and thus make for smooth and quiet operation of the saw as a whole.

A still further object of the invention is to provide a cable variety stone cutting saw which is generally of new and improved construction, effectively and efficiently fulfills its intended purpose and not only has exceptionally long life and high efficiency but also is capable of being produced at a comparatively low cost.

Other objects of the invention and various advantages and characteristics of the present cable variety stone cutting saw will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side view showing a saw embodying the invention in operative relation with a pair of pulleys;

Figure 2 is a view partly in side elevation and partly in section of a portion of the upper reach of the saw;

Figure 3 is a vertical or transverse section on the line 3—3 of Figure 2;

Figure 4 is a longitudinal section of one of the cutting elements of the saw that is illustrated in Figures 1, 2 and 3;

Figure 5 is a longitudinal section of a different form or type of cutting element; and Figure 6 is a longitudinal section of another form or type of cutting element.

The saw which is illustrated in Figures 1 to 4, inclusive, of the drawings constitutes the preferred form or embodiment of the invention. It is adapted to cut a stone block 7 and is mounted on, and supported by, a pair of pulleys 8. As its parts or components the saw comprises an endless flexible wire cable 9, a plurality of cutting elements 10, and a plurality of springs 11. It is contemplated in connection with a cutting operation that the stone block 7 will be supported beneath the saw and that the saw will be progressively fed downwards. If desired, the stone block 7 may be supported on a horizontal series of side by side rollers 12, the ends of which are provided with trunnions 13 which extend through, and are journalled in, bearings 14 on a pair of laterally spaced horizontally extending channel bars 15. The rollers 12 permit the stone block, before cutting, to be moved or transported under the saw and also permit the pieces of the block, after cutting, to be moved away from the saw. The two pulleys 8 for supporting the saw are spaced apart horizontally and have circumferential grooves 16 in their rims or peripheries. They are the same in size and are supported rotatably by horizontal stub shafts 17. The latter extend through the central portions of the pulleys and have the ends thereof journalled in bearings 18 on the lower ends of the side legs of a pair of inverted U-shaped brackets 19. Such brackets, as shown in Figure 1, are connected to, and depend from, the end portions of a horizontally extending beam 20. The ends of the beam are mounted for vertical sliding movement with respect to a pair of laterally spaced standards 21 in order that the pulleys 8 together with the saw may be fed upwards or downwards. Any suitable power mechanism (not shown) may be employed to drive one of the pulleys 8 in order to effect drive of the saw in connection with a stone cutting operation. It is contemplated that during a stone cutting operation the pulley 8 together with the saw will be fed slowly downwards and at the end of a cutting operation the pulleys and saw will be raised.

The endless cable 9 of the saw consists of a plurality of twisted steel wires 22 around a core 23 of steel or other suitable material and is trained around, and supported by, the two pulleys 8. By reason of the fact that the cable is trained around the two pulleys the cable embodies upper and lower horizontally extending reaches. In connection with a stone cutting operation the lower reach of the cable traverses the stone block 7 as shown in Figure 1 of the drawing. The portions of the cable 9 which extend around the pulleys fit within portions of the circumferential grooves 16 in the rim or peripheral portions of the pulleys. It is contemplated that in connection with a stone cutting operation the pulley that is driven by the aforementioned power mechanism will be driven in such direction as to cause the cable 9 to travel in a counterclockwise direction as viewed in Figure 1.

The cutting elements 10 of the saw consist of tubular body parts 24, and annular cutting parts 25 and are mounted on the cable 9 in spaced apart relation. The body parts 24 are preferably formed of steel of substantially the same hardness as the steel of which the cable wires 22 are formed. They are circular in cross section and have smooth unobstructed cylindrical inner peripheries 26 which fit loosely around the cable 9 in order that the cutting elements 10 are permitted to slide or move lengthwise of the cable. The leading ends of the tubular body parts 24, i. e., the ends that face in the direction of travel of the cable, are provided with integral rigid outwardly extending annular flanges 27. The outer surfaces or peripheries of these flanges are forwardly and uniformly tapered and hence the flanges progressively increase in external diameter from front to back. The front end surfaces of the flanges 27 are flush with the front end surface of the tubular body parts 24 of the cutting elements 10 and the rear end surfaces of the flanges are flat and form with the outer peripheries of the rear ends of the tubular body parts annular seats 28. The annular cutting parts 25 of the cutting elements 10 fit within the annular seats 28, consist of rigid metallic matrices and crushed or fragmented diamonds distributed substantially uniformly throughout the matrices, and are formed by molding them under heat and pressure. Preferably the matrices of the cutting parts are formed of sintered metal powder. In practice it has been found that satisfactory results are obtainable when the matrices for the crushed or fragmented diamonds are formed by mixing together and then sintering in connection with the molding operation iron, copper, tin and nickel. The percentages by weight are: iron—26, copper—26, tin—24 and nickel—24. The mesh size of the crushed or fragmented diamonds which are distributed substantially uniformly throughout the metallic matrices of the cutting parts is determined by the type of stone that is to be cut by the saw. If the stone is comparatively soft, like sandstone, diamonds having a mesh size of from 8 to 40 may be used. If the stone to be cut is marble, diamonds having a mesh size of from 20 to 80 may be employed. If the stone to be cut is comparatively hard, like granite, for example, diamonds having a mesh size of from 40 to 120 may be used. The inner peripheries of the annular cutting parts 25 extend directly around the outer peripheries of the rear end portions of the tubular body parts 24 and are bonded thereto by coatings 29 of solder. The front end surfaces of the cutting parts 25 abut against the rear end surfaces of the annular outwardly extending flanges 27 and are fixedly bonded thereto by coatings 30 of solder. Preferably the solder which is used to form the coatings 29 and 30 is a silver solder which is known commercially as "Easy-Flow #3." The rear end surfaces of the cutting parts 25 are flush with the rear end surfaces of the tubular body parts 24, as shown in Figures 2 and 4. The external diameter of the cutting parts 25 is slightly greater than the diameter of the rear or large ends of the integral outwardly extending annular flanges 27 in order that the outer peripheral portions of the cutting parts project outwards of the rear or large ends of the flanges and thus expose crushed or fragmented diamonds for stone cutting purposes. By reason of the fact that the inner peripheries of the tubular body parts 24 are cylindrical and fit loosely around the cable 9 the cutting elements are free to revolve or rotate relatively to the cable and also to slide lengthwise of the cable. The tubular metallic body parts 24 serve to hold the annular cutting parts 25 out of engagement with the cable 9 and hence the cable is not contacted by crushed or fragmented diamonds which would tend to cut or wear it and thus reduce the life of the saw as a whole. The integral annular outwardly extending flanges 27 on the front or leading ends of the tubular body parts 24 have a two fold purpose in that they serve, first, to absorb shock or impact resulting from contact of the cutting elements with the stone being cut and tending to fracture the annular cutting parts 25 and, second, to form barriers for protecting the front end portion of the annular cutting parts from being rapidly worn away by sludge. In connection with a stone cutting operation it is contemplated that a liquid coolant will be directed against the lower reach of the cable 9 in order to cool the cable and also the cutting elements 10, the springs 11 and the part or portion of the stone being cut by the cutting elements. The cut stone particles mix with the coolant and form sludge which, except for the integral annular outwardly extending flanges 27, would cause rapid wear of the annular cutting parts 25. By reason of the fact that the flanges are forwardly tapered the cutting elements 10 slide or travel readily and smoothly across the portion of the stone being cut. Because of this the saw as a whole is smooth and quiet in operation and requires a minimum amount of power to drive it.

The springs 11 of the saw are preferably helical springs and formed of steel wire. They extend around the cable 9 and are disposed between the cutting elements 10. The purpose of the springs 11 is to space the cutting elements apart while at the same time permitting them to slide to a limited extent lengthwise of the cable during a stone cutting operation.

When it is desired to cut the stone block 7 by the saw the block is first placed on the rollers 12 and then shifted bodily under the saw. After the block is properly positioned the saw is driven by effecting drive of one of the pulleys 8, and the two pulleys with the cable therearound are fed slowly downwards in order to cause the lower reach of the cable to traverse the block 7. In connection with drive of the saw the annular cutting parts 25 of the cutting elements 10 slide successively across the block and effect cutting thereof. In connection with successive travel of the cutting elements across the stone block 7 the integral annular outwardly extending flanges 27 on the front ends of the tubular body parts 24 of the cutting elements 10 absorb shock tending to fracture the annular cutting parts 25 and also form barriers for protecting the front end portions of the cutting parts from being rapidly worn away by sludge. As heretofore indicated, the tubular body parts 24 serve to space the annular cutting parts 25 from the cable and thus prevent such parts from cutting and wearing away the cable, especially when the cutting elements are travelling in the lower reach of the cable or around the pulleys 8.

The cutting element which is shown in Figure 5 of the drawing constitutes a modified or slightly different form of cutting element. It comprises a tubular body part 24a and an annular cutting part 25a. The body part 24a is formed of steel or any other suitable metal and has a cylindrical inner cable-receiving periphery 26a. The front or leading end of the tubular body is provided with an integral annular outwardly extending flange 27a. The latter functions in the same manner and serves the same purpose as the outwardly extending flanges 27 of the cutting elements 10 of the saw of Figures 1 to 4, inclusive, but differs therefrom in that instead of being forwardly tapered it has a cylindrical outer periphery except for the front portion which is quarter round. The quarter round front outer portion of the flange functions in the same manner as the tapered outer peripheral portions of the flanges 27 of the cutting elements 10. The rear end surface of the flange 27 is flat and defines with the rear or trailing end portion of the tubular body part 24a an annular seat 28a for the annular cutting part 25a. The latter is the same as the cutting parts 25 of the cutting elements 10 and consists of a rigid metallic matrix and crushed or fragmented diamonds distributed substantially uniformly throughout the matrix. The annular cutting part 25a is bonded in place within the seat 28a by silver solder and is of greater external diameter than the flange 27a in order that certain of the diamond particles thereof are exposed for cutting purposes. It is contemplated that the cutting element of Figure 5 will be employed with similar cutting elements, an endless flexible wire cable and a plurality of spiral or helical springs in order to form a cable variety stone cutting saw like that of Figures 1 to 4, inclusive.

The cutting element which is shown in Figure 6 of the drawing constitutes a different modified form of cutting element. It comprises a tubular body member 24b and an annular cutting part 25b. The body part 24b is formed of steel or any other suitable metal and has a cylindrical inner cable-receiving periphery 26b. The front or leading end of the tubular body is provided with an integral annular outwardly extending flange 27b. The latter is forwardly tapered like the flanges 27 of the tubular body parts 24 of the cutting elements 10 and serves the same purpose and functions in the same manner as said flanges 27. The rear end of the body part 24b is provided with an integral outwardly extending annular flange 27bb. The latter is rearwardly tapered and the same in size and contour as the flange 27b. The inner end surfaces of the flanges 27b and 27bb define with the central portion of the tubular body 24b an annular seat 28b for the annular cutting part 25b. The latter is the same as the cutting parts 25 of the cutting elements 10 and consists of a rigid metallic matrix and crushed or fragmented diamonds distributed substantially uniformly throughout the matrix. The annular cutting part 25b is bonded in place within the seat 28b by silver solder and is of greater external diameter than the inner or large ends of the flanges 27b and 27bb in order that certain of the diamond particles thereof are exposed for cutting purposes. The flange 27bb on the rear end of the tubular body part 24b coacts with the flange 27b positively to hold the annular cutting part 25b within the annular seat 28b. It is contemplated that the annular cutting part 25b will in connection with fabrication of the cutting element of Figure 6 be molded within the seat 28b. It is also contemplated that the cutting element of Figure 6 will be employed with similar cutting elements, an endless flexible cable and a plurality of springs in order to form a cable variety stone cutting saw like that of Figures 1 to 4, inclusive. The integral annular outwardly extending flange 27b together with the flange 27bb permits the cutting element of Figure 6 to be moved or driven in a clockwise direction as well as a counterclockwise direction.

The herein described cable variety stone cutting saw effectively and efficiently fulfills its intended purpose, has exceptionally long life and high efficiency and is capable of being produced at a comparatively low cost due to the particular design and construction of the two-part cutting elements thereof.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a saw designed primarily for use in cutting stone and comprising an endless flexible cable adapted to be positioned around a pair of spaced apart pulleys and driven in one direction, and a plurality of cutting elements mounted on the cable in spaced apart relation and consisting of tubular metallic body parts extending around the cable, having smooth unobstructed cylindrical inner peripheries in loosely encircling relation with the cable and provided at their front or leading ends with outwardly extending annular flanges, and annular cutting parts extending around and fixedly bonded to the body parts at locations directly behind the flanges and formed of rigid matrices and abrasive particles distributed substantially uniformly throughout the matrices and resilient spiral springs extending around the cable and disposed between the cutting elements, said cutting parts being of greater external diameter than the flanges in order that their outer portions project beyond the outer peripheries of the flanges, said flanges being rigid and adapted during operation of the saw to absorb shock resulting from contact of the cutting elements with the stone being cut and tending to fracture the annular cutting parts and disloge them from the tubular body parts and also to form barriers for protecting the front end portions of said annular cutting parts from being rapidly worn away by sludge.

2. As a new article of manufacture, a saw designed primarily for use in cutting stone and comprising an endless flexible cable adapted to be trained around a pair of spaced apart pulleys and driven in one direction, and a plurality of two-part cutting elements mounted on the cable in spaced apart relation and consisting of tubular body parts extending loosely and rotatably around the cable, formed of compartively non-abrasive metal, and provided at their front or leading ends with integral outwardly extending annular flanges, and annular cutting parts extending around, and fixedly bonded to, the body parts at locations directly behind the flanges and formed of rigid metallic matrices and crushed or fragmented diamonds distributed substantially uniformly throughout said matrices, and tubular members extending around the the cable and disposed between, and serving to space apart, said cutting elements, said cutting parts being of slightly greater external diameter than the flanges in order that their outer portions project beyond the outer peripheries of said flanges, said flanges being rigid and adapted during operation of the saw to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

3. As a new article of manufacture, a saw designed primarily for use in cutting stone and comprising an endless flexible cable adapted to be trained around a pair of spaced apart pulleys and driven in one direction, and a plurality of cutting elements mounted on the cable in spaced apart relation and consisting of tubular body parts extending around the cable, formed of solid comparatively non-abrasive material, and provided at their front or leading ends with outwardly extending annular flanges which progressively increase in external diameter from front to back, and annular cutting parts extending around, and fixedly bonded to, the body parts at locations directly behind the flanges and formed of rigid matrices and abrasive particles distributed substantially uniformly throughout said matrices, said cutting parts being of greater external diameter than the maximum diameter of the flanges in order that their outer portions project beyond the large rear ends of the flanges, said flanges being rigid and adapted during operation of the saw to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

4. As a new article of manufacture, a saw designed primarily for use in cutting stone and comprising an endless flexible cable adapted to be trained around a pair of spaced apart pulleys and driven in one direction, and a plurality of cutting elements mounted on the cable in spaced apart relation and consisting of tubular metallic body parts extending around the cable, formed of comparatively non-abrasive material and provided at their front or leading ends with integral outwardly extending annular flanges with forwardly and uniformly tapered outer peripheries, and annular cutting parts extending around, and fixedly bonded to, the body parts at locations directly behind the flanges and formed of rigid matrices and abrasive particles distributed substantially uniformly throughout said matrices, said cutting parts being of greater external diameter than the maximum diameter of the flanges in order that their outer portions project beyond the large rear or inner ends of the flanges, said flanges being rigid and adapted during operation of the saw to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

5. As a new article of manufacture, a saw designed primarily for use in cutting stone and comprising an endless flexible cable adapted to be trained around a pair of spaced apart pulleys and driven in one direction, and a plurality of two-part cutting elements mounted on the cable in spaced apart relation and consisting of tubular metallic body parts extending around the cable and provided at their front or leading ends with integral outwardly extending annular flanges which progressively increase in external diameter from front to back, and annular cutting parts extending around the body parts at locations directly behind the flanges, formed of rigid metallic matrices and crushed or fragmented diamonds distributed substantially uniformly throughout said matrices, and having the inner peripheries thereof bonded fixedly to said body parts and their front end surfaces bonded fixedly to the inner end surfaces of the flanges, said cutting parts being of greater external diameter than the rear or inner large ends of the flanges in order that their outer portions project beyond said large ends of the flanges, said flanges being rigid and adapted during operation of the saw to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

6. As a new article of manufacture, a saw designed primarily for use in cutting stone and comprising an endless flexible cable adapted to be trained about a pair of spaced apart pulleys and driven in one direction, and a plurality of cutting parts mounted on the cable in spaced apart relation and consisting of tubular body parts extending around the cable, formed of comparatively non-abrasive material, and provided at their front or leading ends with outwardly extending annular flanges the front outer corners of which are substantially quarter round, and annular cutting parts extending around, fixedly bonded to, the body parts at locations directly behind the flanges and formed of rigid matrices and abrasive particles distributed substantially uniformly throughout said matrices, said cutting parts being of greater external diameter than the maximum diameter of the flanges in order that their outer portions project outwards of the flanges, said flanges being rigid and adapted during operation of the saw to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

7. As a new article of manufacture, a saw designed primarily for use in cutting stone and comprising an endless flexible cable adapted to be trained around a pair of spaced apart pulleys and driven in either direction, and a plurality of cutting elements mounted on the cable in spaced apart relation and consisting of tubular body parts extending around the cable, formed of comparatively non-abrasive material, and provided at their ends with outwardly extending annular flanges with outwardly tapered outer peripheries, and annular cutting parts extending around the central portions of the body parts, disposed between and abutting against the inner ends of the flanges and formed of rigid matrices and abrasive particles distributed substantially uniformly throughout said matrices, said cutting parts being of greater external diameter than the inner large ends of the flanges in order that their outer portions project beyond said inner large ends of the flanges, said flanges being rigid and the leading flanges being adapted to absorb shock resulting from contact of the cutting elements with the stone being cut and tending to fracture the annular cutting parts and dislodge them from the tubular body parts and also to form barriers for protecting the front end portions of said annular cutting parts from being rapidly worn away by sludge.

8. As a new article of manufacture, a saw designed primarily for use in cutting stone and comprising an endless flexible cable adapted to be trained around a pair of spaced apart pulleys and driven in one direction, and a plurality of cutting elements mounted on the cable in spaced apart relation and consisting of annular cutting parts extending around, but out of contact with, the cable and formed of rigid matrices and abrasive particles distributed substantially uniformly throughout said matrices, and annular metallic flange like members fitting against, and bonded fixedly to, the front end surfaces of the cutting parts and serving as barrier forming and shock absorbing means for said cutting parts during operation of the saw, said annular flange like members being concentrically positioned with respect to, but of less external diameter than, said cutting parts.

9. As a new article of manufacture, a saw designed primarily for use in cutting stone and comprising an endless flexible cable adapted to be trained around a pair of spaced apart pulleys and driven in one direction, and a plurality of cutting elements mounted on the cable in spaced apart relation and consisting of annular cutting parts extending around the cable and formed of rigid metallic matrices and crushed or fragmented diamonds distributed substantially uniformly throughout said matrices, and annular metallic flange like members fitting against, and bonded fixedly to, the front end surfaces of the cutting parts and serving as barrier forming and shock absorbing means for said cutting parts during operation of the saw, said annular flange like members having their outer peripheries tapered in the direction of travel of the cable and being concentrically positioned with respect to, but of less maximum external diameter than, said cutting parts.

10. As a new article of manufacture, a cutting element adapted with like elements and an endless flexible cable to form a saw for cutting stone and comprising a tubular body part formed of comparatively non-abrasive material, having the inner periphery thereof shaped and adapted to extend around the cable, and provided at one end thereof with an outwardly extending annular flange, and an annular cutting part extending around, and fixedly bonded to, the body part at a location directly inwards of the flange and formed of a rigid matrix and abrasive particles distributed substantially uniformly throughout the matrix, said cutting part being of greater external diameter than the flange in order that its outer portion projects beyond the outer periphery of said flange.

11. As a new article of manufacture, a cutting element adapted with like elements and a cable to form a saw for cutting stone and comprising a tubular metallic body part having the inner periphery thereof shaped and adapted to extend loosely around the cable, and provided at its front end with an integral outwardly extending forwardly tapered flange, and an annular cutting part extending around the body part at a location directly behind the inner large end of the flange, formed of a rigid metallic matrix and crushed or fragmented diamonds distributed substantially uniformly throughout the matrix, and having the inner periphery thereof bonded fixedly to the adjacent portion of the body part and its front end surface bonded fixedly to the inner end surface of the flange, said cutting part being of greater external diameter than the inner large end of the flange in order that its outer portion projects beyond said inner large end of the flange, said flange being rigid and serving during use of the cutting element as a shock absorbing and barrier forming medium for the cutting part.

12. As a new article of manufacture, a saw designed primarily for use in cutting stone and comprising an endless flexible cable adapted to be trained around a pair of spaced apart pulleys and driven in one direction, and a plurality of cutting elements mounted on the cable in spaced apart relation and consisting of annular cutting parts extending around the cable and formed of matrices and abrasive particles distributed substantially uniformly throughout said matrices, and annular flange like members fitting against, and bonded to, the front end surfaces of the cutting parts and serving as barrier forming and shock absorbing means for said cutting parts during operation of the saw, said annular flange like members being concentrically positioned with respect to, but of less external diameter than, said cutting parts.

References Cited in the file of this patent

UNITED STATES PATENTS

| Number | Name | Date |
| --- | --- | --- |
| Re. 21,165 | Van Der Pyl | July 25, 1939 |
| 184,804 | Stohlmann | Nov. 28, 1876 |
| 379,835 | Turrettini | Mar. 20, 1888 |
| 1,625,463 | Gauthier | Apr. 19, 1927 |
| 2,189,259 | Van Der Pyl | Feb. 6, 1940 |

FOREIGN PATENTS

| Number | Country | Date |
| --- | --- | --- |
| 13,417 | Great Britain | 1900 |
| 437,117 | France | Apr. 13, 1912 |
| 623,686 | Great Britain | May 20, 1949 |
| 644,726 | Great Britain | Oct. 18, 1950 |
| 969,357 | France | Dec. 19, 1950 |